United States Patent [19]
Gauthier

[11] Patent Number: 5,684,798
[45] Date of Patent: Nov. 4, 1997

[54] COMMUNICATION SYSTEM COMPRISING A NETWORK AND A MULTIPLEXING DEVICE AND MULTIPLEXING DEVICE SUITABLE FOR SUCH A SYSTEM

[75] Inventor: Jean-Pierre Gauthier, Jouy en Josas, France

[73] Assignee: U.S. Philips Corporation, New York, N.Y.

[21] Appl. No.: 493,782

[22] Filed: Jun. 22, 1995

[30] Foreign Application Priority Data

Jun. 22, 1994 [FR] France ................... 94 07664

[51] Int. Cl.$^6$ ................................. H04L 12/56
[52] U.S. Cl. ........................... 370/395; 370/408
[58] Field of Search ............... 370/60, 60.1, 61, 370/94.1, 94.2, 94.3, 85.6, 356–358, 389, 391, 393, 395, 396, 399, 408, 409, 425, 455, 444; 340/825.5, 825.51, 825.52

[56] References Cited

U.S. PATENT DOCUMENTS 5,062,106  10/1991  Yamazaki et al. ............. 370/85.6
5,128,932   7/1992  Li ................................. 370/85.6

OTHER PUBLICATIONS

"Asynchronous Transfer Mode" by Martin de Prycker, published in the Ellis Horwood.

PHF 94–520 English language translation of FR 93 03776 "Communication System".

Primary Examiner—Dang Ton
Attorney, Agent, or Firm—David R. Treacy

[57] ABSTRACT

An ATM network with circuits means for managing the transmission of ATM cells. An allocation circuit comprises a tree circuit which cooperates with a date calculation circuit. This calculation circuit assigns a date to each of the transmit cells as a function of the desired rate. The tree circuit is passed through, on the one hand, in a direction from leaves to root for determining the dates that have the smallest value in a classification according to priority of the calculated dates and, on the other hand, in the direction from root to leaves for selecting the date that has the highest priority and is smaller than a current date produced by a dating element.

8 Claims, 6 Drawing Sheets

COMMUNICATION SYSTEM COMPRISING A NETWORK AND A MULTIPLEXING DEVICE AND MULTIPLEXING DEVICE SUITABLE FOR SUCH A SYSTEM

BACK OF THE INVENTION

1. Field of the Invention

The present invention relates to a communication system formed by at least a network of the ATM type, which transmits from one of its access points to another access point information cells which comprise a path identifier (VP) and at least one multiplexing device formed by:

a plurality of access terminals for users who have cells to be transmitted at a certain rate to a certain destination defined by said path identifier, at least one connecting terminal for at least one access point of said network, a plurality of service circuits which comprise queue elements for storing each the user cells which have a like path identifier and for rendering the stored cells available on cell outputs, an allocation circuit for providing that from the available cells a cell called chosen cell is supplied on said connecting terminal via an output circuit.

The invention likewise relates to a multiplexing device suitable for such a system.

2. Discussion of the Related Art

ATM networks are more and more widely used and, to make maximum use of the possibilities they provide, it is appropriate that the data the user wishes to transmit are multiplexed at various rates and that the user is satisfied with services of diverse kind.

Such a system is described in French Patent Application no. 93 03776 filed in the name of the Applicants on 31 March 1993. In this known system an allocation Table is used of which the boxes are filled beforehand by a management circuit of the system. This circuit assigns the boxes of the Table to the service circuits as a function of their respective rates, starting with the highest rate and ending with the lowest rate. If a box is already occupied (of necessity by a service circuit whose required rate is higher), the first following empty box is sought and then used. This Table is then used by periodically and cyclically scanning same via a current pointer which is incremented and designates the chosen service circuit and thus its path identifier (VP).

Although it gives satisfaction, it has been established that this known system needed some improvements, more specifically, as regards the reduction of the jitter G. This magnitude G is defined by: G: (dee-dth)*D, where "dee" is the effective transmission date of the cell under consideration and "dth" is the theoretical transmission date calculated on the basis of the rate a service is to provide for which the cell is assigned and "D" is the required rate measured in cells per second.

This known system may cause jitter to occur that is incompatible with a real time service. This is the case when a cell for a given service appears just after a preceding cell of this same service has been chosen from the Table. This second cell will not be taken into account until a "1/D" period has elapsed. The jitter then reaches 100% or more.

SUMMARY OF THE INVENTION

The present invention proposes a system of the type mentioned in the opening paragraph which causes less jitter to occur.

Therefore, such a system is characterized in that the allocation circuit comprises:

a correspondence Table for unambiguously assigning the path identifiers to a priority code which fixes an order of transmit priority of the cells as a function of the rate, a theoretical transmission date calculation element for providing a date called theoretical transmission date as a function of the rate for cells received by each service circuit, and a first tree circuit constituted by
"leaves" for receiving the theoretical dates for each service circuit,
a "root" for containing dates called root dates based upon which the highest-priority date is established,
an extraction circuit for producing the priority code based upon root dates for the selection of the date.

The system according to the invention solves the problem of jitter in a satisfactory manner when the traffic lead is not too considerable.

In a Preferred embodiment of the invention the allocation circuit comprises a stop date calculation circuit for producing a date for each path identifier (VP) as a function of tolerable jitter while this tolerance is taken into consideration, a second tree circuit connected in a cascade combination with the first tree circuit, cooperating with this stop date calculation circuit for producing at its root the lowest stop date based upon which the chosen cell of the path identifier is determined. This embodiment provides the additional advantage that the jitter remains tolerable even when the traffic load is considerable.

BRIEF DESCRIPTION OF THE DRAWINGS

These and other aspects of the invention will be apparent from and elucidated with reference to the embodiments described hereinafter.

In the drawings.

DETAILED DESCRIPTION OF THE PREFERRED EMBODIMENT

Figure 1:
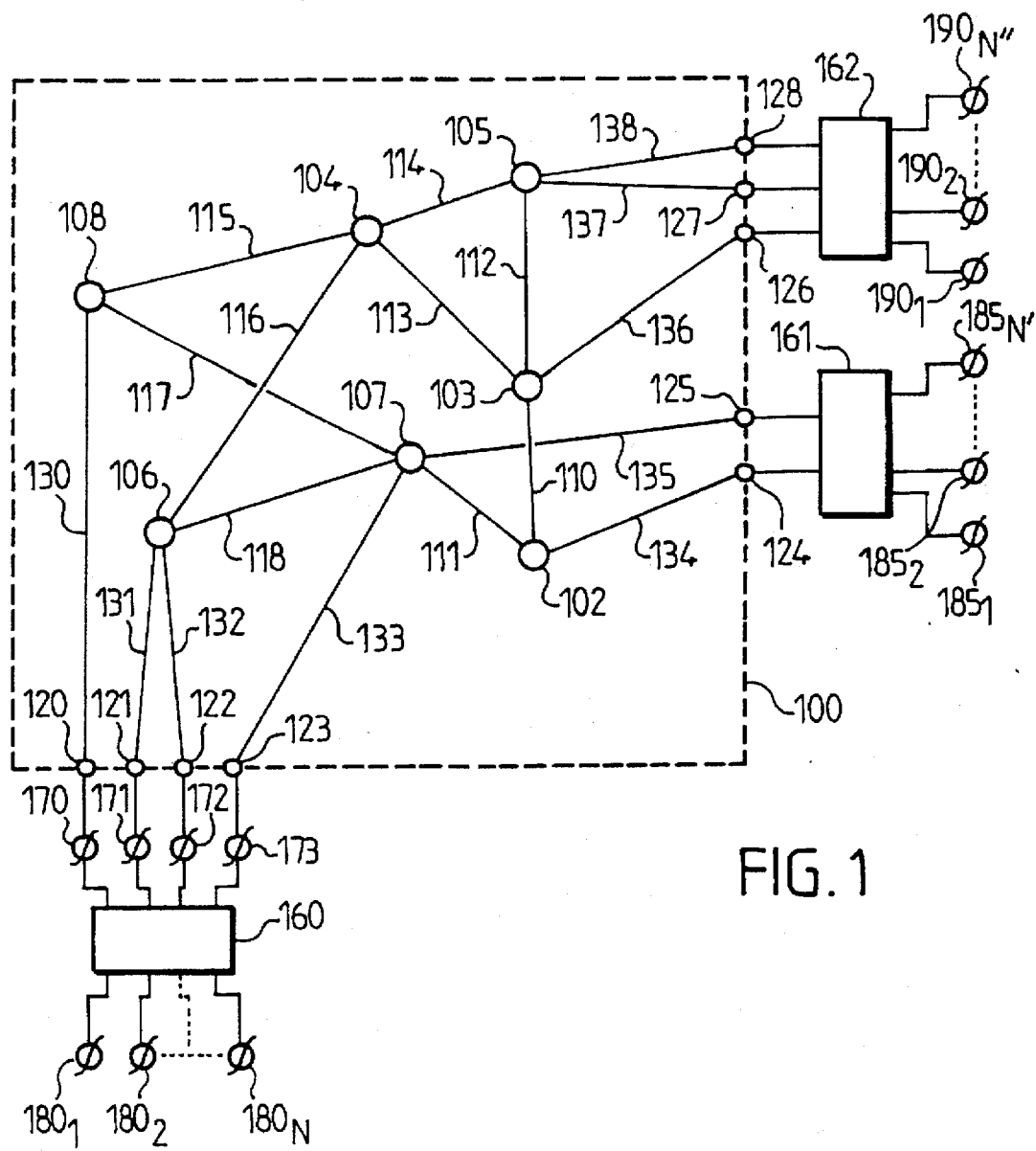
FIG. 1 shows a system in accordance with the invention.
Figure 2:
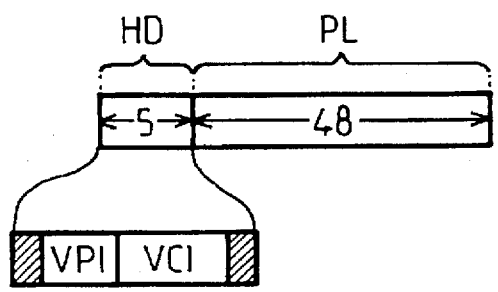
FIG. 2 shows the structure of the information cells transmitted by the network.

FIG. 1 shows in a diagrammatic manner an ATM network referenced 100 in the drawing Figure. A description of this network will be found in the publication "ASYNCHRONOUS TRANSFER MODE" by MARTIN de PRYCKER, published in the ELLIS HORWOOD editions in Britain. This network is formed by various nodes 102, 103, 104, 105, 106, 107 and 108 interconnected by links 110 to 118 for connecting respectively the nodes 102–103, 102–107, 103–105, 103–104, 104–105, 104–108, 104–106, 107–108 and 106–107. Various access points to this network are denoted by 120 to 128. These access points are connected respectively to the nodes 108, 106, 107, 102, 107, 103 and 105 via the links 130 to 138. Various multiplexing and demultiplexing devices 160, 161, and 162 are connected to these access points. Among these devices which form part of the present invention there should be distinguished: a multiplexing device 160 and two demultiplexing devices 161 and 162 which perform reverse operations to those of device 160. To be connected to the four points 120, 121,122 and 123, the multiplexing device 160 has four connecting terminals 170, 171, 172 and 173. Thus, within the framework of this described example, the information can go from device 160 to the devices 162 and 164 by passing through a network 100. This transmit information is applied to a plurality of access terminals $180_1$ to $180_N$ which demultiplexing device 160 has and can, for example, be produced on output terminals $185_1$ to $185_N$ of device 161 and $190_1$ to $190_N$ of device 162. The information transmitted through the network is produced in the form of cells whose shape is shown in FIG. 2. These cells are formed by 53 octets of which 5 form the header field HD and the 48 remaining octets referenced PL contain the data for a transmission service. In the header field two codes VPI and VCI are distinguished which correspond to virtual path identifier and virtual circuit identifier, respectively. The virtual path identifier is processed by the transmission operator and the virtual circuit identifier by the user.

Figure 3:
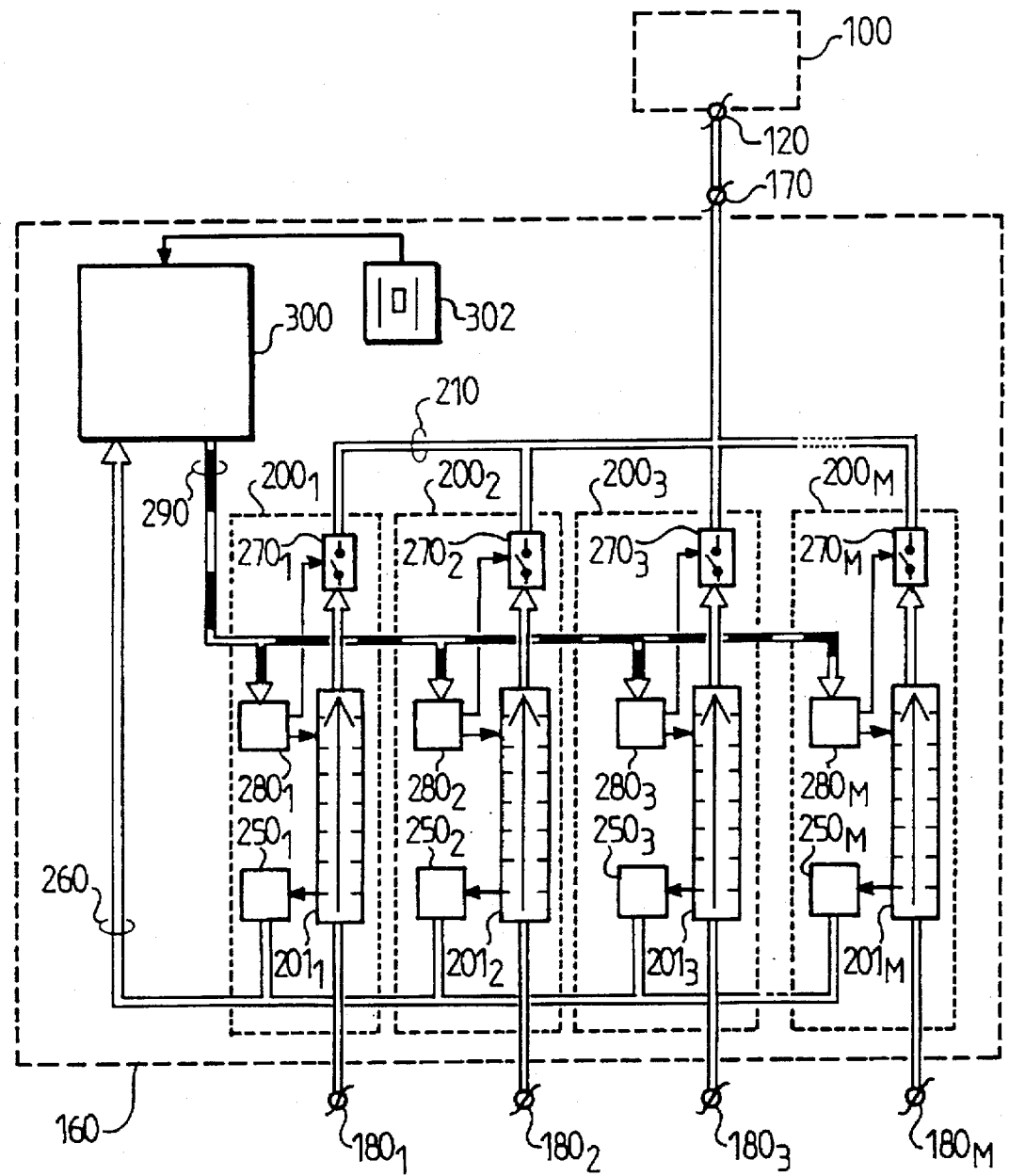
FIG. 3 shows a multiplexing device in accordance with the invention.

FIG. 3 shows a diagram of the multiplexing device 160. To simplify the description; attention is only paid in this figure to the cells to be supplied to the single terminal 170 from certain number of access terminals $180_1$ to $180_M$ and only the codes VPI termed path identifiers (VP) will be considered. For locating the problems which the invention proposes to solve, M has a relatively high value taken equal to 4096.

Each of these terminals $180_1$ to $180_M$ is capable of receiving cells that have the same identifier and the same rate. This rate is defined by: $1/td_i$ where $td_i$ represents the time separating two cells and the index i ($1 \leq i \leq M$) determines the index of the accesses $180_1$ to $180_M$. The cells are stored in queue elements $200_1$, $200_2$, $200_3$, . . . , $200_M$ formed on the basis of memories of the FIFO type $201_1$, $201_2$, $201_3$, . . . , $201_M$, respectively. These memories return on their output the data in the order in which they have come in. A recognition code is assigned to each of these elements $200_1$, $200_2$, $200_3$, . . . , $200_M$. This recognition code will be ranked as the path identifier (VP) for reasons of simplifying the explanation. A common data line 210 connects the output of the queue elements to the terminal 170. Each queue element comprises a notification circuit 250 for notifying the presence of a cell on its input. This circuit sends this notification accompanied by the recognition code over a common line 260. The queue elements also comprise send authorization elements which are shown in the form of a switch $270_i$, on the one hand, and a decoding element $280_i$, on the other. The input of this decoding element is connected to a third common line 290 which interconnects all the queue elements $200_1$, $200_2$, $200_3$, . . . , $200_M$.

An allocation circuit 300 processing the notifications transmitted over line 260 produces on the line 290 the recognition code to authorize the queue element indicated by this code to transmit a cell called chosen cell. This allocation circuit operates in timing with a clock 302 which also supplies other signals (in a manner not shown) to the various elements of the multiplexing circuit.

Figure 4:
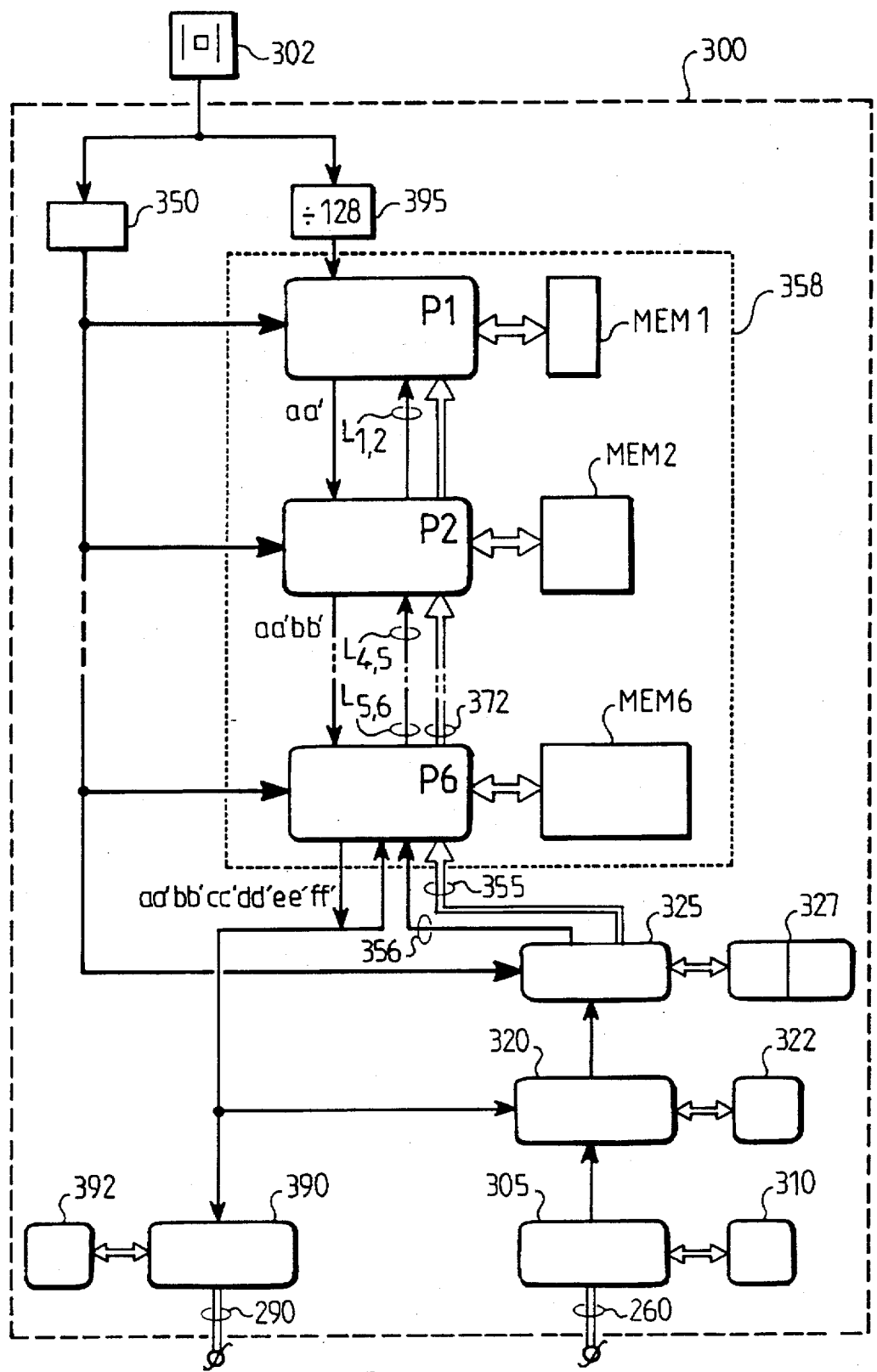
FIG. 4 shows the structure of an allocation circuit which forms part of the device shown in FIG. 3.
Figure 5:
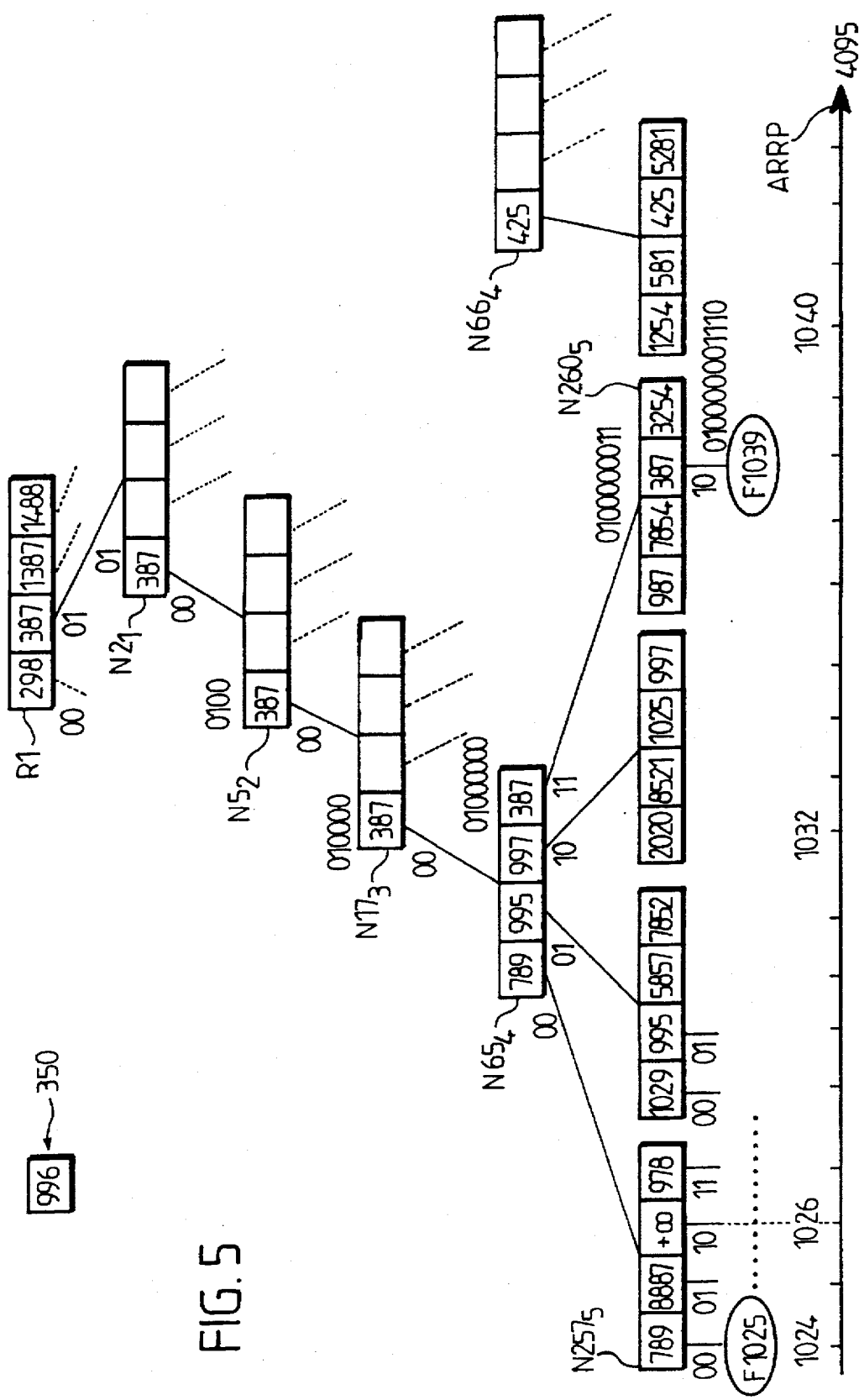
FIG. 5 shows the tree-like structure on which the invention is based.

According to the invention the allocation circuit 300 shown in FIG. 4 is based on an operation of a branching off explained with the aid of FIG. 5.

This branching off in the framework of the described embodiment is a quaternary branching, that is to say, that four nodes $N1_1$, to $N4_1$ forming a first stage of nodes are branched off from a root $R_1$ and that four further nodes $N1_2$ to $N4_2$ are connected to each of these nodes $N1_1$, to $N4_1$, then $N5_2$ to $N8_2$, $N9_2$ to $N12_2$ and $N13_2$ to $N16_2$ of a second stage, to arrive at a twentieth stage where 4096 leaves $F_1$ to $F_{4096}$ are connected to each of the nodes $N1_5$ to $N1024_5$. Only several nodes and leaves are shown in FIG. 5 in order not to clutter the Figure. A direction leaves-root is defined when one starts from the leaves toward the root and a direction root-leaves for the reverse direction.

First this allocation circuit will be described in the direction leaves-root.

There is a notification receiving circuit 305 which receives from line 260 the notification codes coming from the queue elements $250_1$, $250_2$, $250_3$, . . . $250_M$. This circuit assigns by means of a Table 310 a priority code to each recognition code. This priority code is then supplied to a counting element 320 which increments the contents of a line of a Table 322 by unity. This Table 322 makes its lines correspond to the priority code. After this, the priority code is transmitted to a date calculator 325 which cooperates with a third Table 327. This Table 327 is formed by lines which cause the priority code, a theoretical date $dth_i$ and the period $td_i$ to correspond. The date calculator 325 determines the updating date $dth_i$ on the basis of the following considerations, while it takes specifically the current date dtc into account which is produced by a dating element 350 clocked by the clock 302 and also takes the already calculated date $dth_i$ into account which has already been calculated in the preceding operation:

1st Case

The stream is interrupted which is translated by: $dtha_i + dt_i < dtc$, thus $dth_i = dtc$, the cell can thus be transmitted immediately.

2nd Case

The stream is uninterrupted, thus limited by its rate. Consequently, one has: $dtha_i + dt_i \geq dtc$, thus $dth_i = dtha_i + td_i$. The priority code is then transmitted over a set of wires 355 accompanied by the date $dth_i$ transmitted over a set of wires 356 to a leaf processor P6 which forms part of a tree circuit 358. This circuit 358 comprises the processors P1 to P5 in addition to processor P6. To this processor P6 is connected a memory MEM6 organized in 1024 lines containing each four theoretical dates relating to four leaves. The theoretical date will be arranged at a fixed place by its priority code in a manner which will be explained hereinafter. The processor P6 will produce on a set of wires $L_{5,6}$ the smallest theoretical date of said four dates and on a set of wires 372 a location code derived from the priority code. As a function of this information the processor P5 which follows will be effecting the same operations, so that when the last processor P1 is considered, this processor contains in its memory MEM1 the four theoretical dates that have the smallest values. This will be described in more detail in the following description. There has just been described a process in the direction leaves-root.

Now the allocation circuit 300 will be described in the direction root-leaves.

In the memory in the processor P1 are thus arranged the four smallest theoretical dates called root dates. These dates are compared with the current date produced by the dating element 350. The processor P1 takes a single one from these four dates by taking the following steps:

a) only the dates smaller than or equal to the current date are considered, b) choose the element that has the highest priority, that is to say, take the rightmost element that thus normally corresponds to the highest rate, c) go to the node of the lower stage in the direction root-leaves by making use of the location of the element of step b).

If no date is retained, there is evidently no action to be taken. If a date is retained, the location of the retained date at P1, that is, "aa", is transmitted to the processor P2. This location designates a node to which four dates are connected. The same steps will be taken to determine thus a second location code "bb" and the location code for another node is transmitted to P3. The code transmitted to P3 is the concatenation of the two preceding location codes, that is: "aa'bb'". Thus on the output of the processor P6 will be obtained a location code:

*"aa'bb'cc'dd'ee'ff"*

This code corresponds to the priority code and is applied to the code converting circuit 390 which, by means of a Table 392, produces the code VP or the recognition code so as to trasmit this over the line 290 so that the cell is transmitted. The fact that the chosen cell having a certain priority code is transmitted slows down the following actions. A first action consists of the counting element 320 decrementing the contents of the Table 322 by unity on the line relating to the chosen priority code. Another action consists of testing the final count. If this count is not zero, a new theoretical date will be defined which is applied to the tree circuit. If the count is zero, there are thus no longer any cells to be transmitted, and a theoretical date "+∞" is determined which, in principle, has no chance whatsoever of being the chosen date; the reserved code: "+∞" is assigned to this date.

According to an aspect of the invention for a root-leave, s process, a plurality of leaves-root processes can be carried out in the pipeline mode for a single root-leaves process.

The tree circuit operates with a timing produced by a divider circuit 395 which divides the pulses of clock 302, for example, by 128. One may then obtain 42 (128/3) insertions of new theoretical dates for determining a single chosen VP by counting a cycle for the memory access during the root-leaves process and two cycles for the memory access for the leaves-root process.

The circuits which have just been described make it possible to define a chosen cell in a very short period of time comparable with the transmission rate of the ATM networks (155 Mbit/s).

Figure 6:
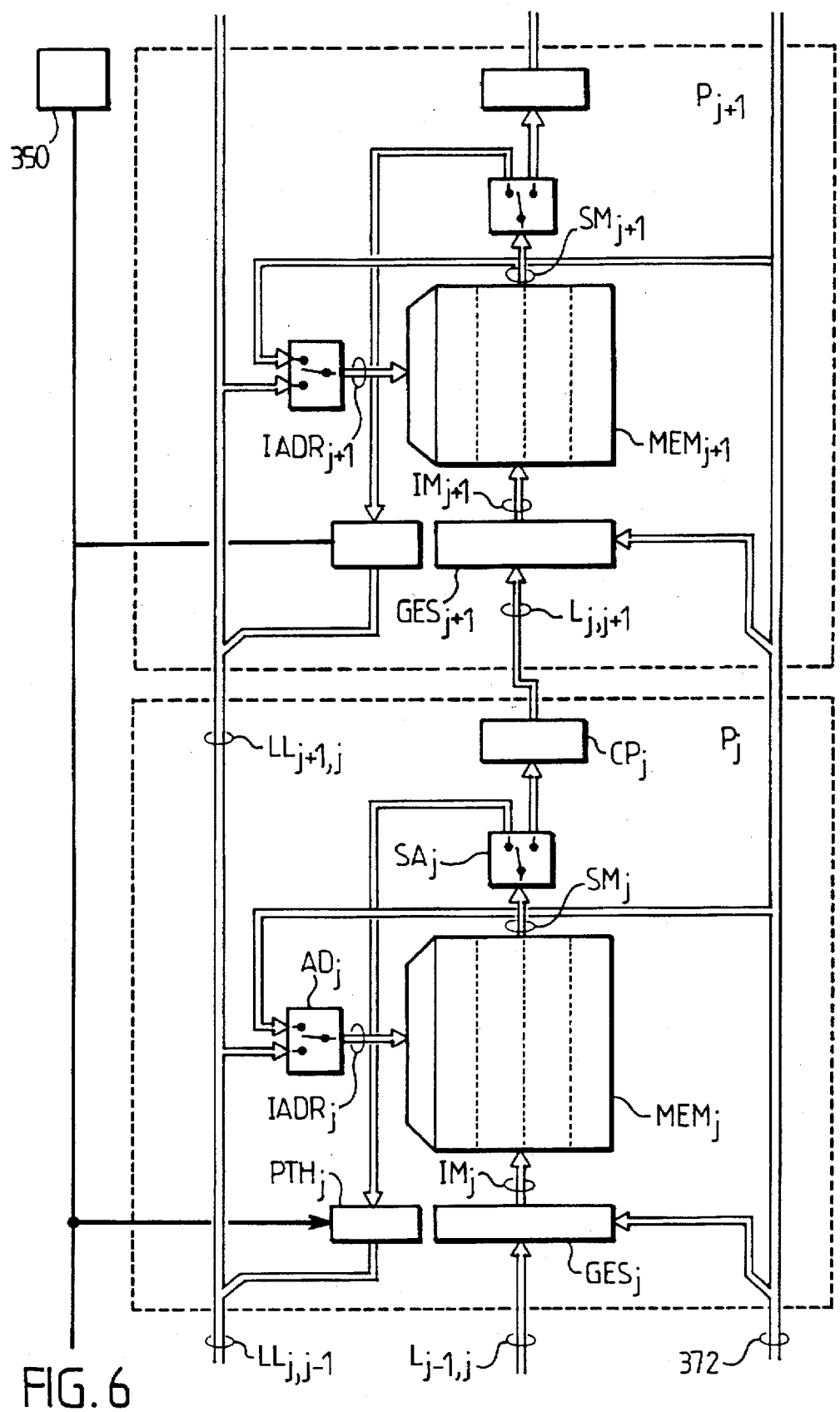
FIG. 6 shows in detail a tree circuit for implementing the tree-like structure shown in FIG. 5.

FIG. 6 shows in detail the organization of the processors with their associated memories.

In this drawing Figure are represented two of these cascaded processors referenced $P_j$ and $P_{j+1}$ respectively, and their associated memories referenced $MEM_j$ and $MEM_{j+1}$. The information which comes upstream when the direction leaves-root is considered is transmitted by the line 372 which transmits the priority codes. Line $L_{j-1,j}$ for the processor $P_j$ and line $L_{j,j+1}$ for the processor $P_{j+1}$ transmit the theoretical dates retained by the upstream processors. The memories $MEM_j$ and $MEM_{j+1}$ have a data output $SM_j$ and $SM_{j+1}$, a data input $IM_j$ and $IM_{j+1}$ and an addressing input $IADR_j$ and $IADR_{j+1}$, respectively. In the following more particularly the processor $P_j$ will be discussed. The data input $IM_j$ is connected to the output of an input management circuit $GES_j$. As the memory $MEM_j$ is organized in lines containing four codes each, the role of the management circuit is to put this code at the right line location. It addresses a line via a two-position switch circuit $AD_j$ by a first part of the code coming from the line 372. The data of said line pass through a two-position switching circuit $SA_j$. In a first period of time the management circuit $GES_j$ overwrites with the code coming from line $L_{j-1,j}$ one of the four codes stored by $MEM_j$ as a function of another pan of the code coming from line 372. In a second period of time a comparing circuit $CP_j$ determines the code having the smallest value contained on this Line so that it can be transmitted to the line $L_{j,j+1}$. This forms the leaves-root process.

The root-leaves process consists first of all of changing the positions of the switch circuits $SA_j$ and $AD_j$. The memory $MEM_j$ is addressed by a code coming from the line $LL_{j+1,j}$ which concatenates the elements of the location code. A searching circuit $PTH_j$, whose input is connected to the data output of memory $MEM_j$ via the switch circuit $SA_j$, produces a location code of the node from which the highest priority date of the line under consideration comes. This location code is established by comparing the codes on its input with those coming from the dating circuit 350. This code is concatenated with the code produced by the processor $P_{j+1}$ on line $LL_{j+1,j}$. The circuits thus described make a pipeline operation possible, that is to say: while the processor manages a code, the next processor manages a preceding code. There will be found that the root-leaves process will take the next updating into account in the case of a leaves-root process code.

The operation of the allocation circuit may now be explained with reference to FIG. 5.

In this drawing Figure the various leaves comprise each theoretical dates calculated by the date calculation element 325. The priorities are shown along an arrow ARRP.

For example, there is assumed that there are no longer cells relating to the priority code 1026, which is indicated by the counting element 320 of FIG. 4; then as a theoretical date will be marked the largest possible: "+∞". Then one is certain that this date will never be chosen. The processor P6 which controls the nodes $N1_5$ to $N1024_5$ (several of them are referenced in FIG. 5, the nodes $N257_5$ and $N260_5$) will send the smallest dates to the processor P5, that is: 789, 995, 997, 387 . . . , respectively. In FIG. 5 it is the date 387 that comes from node $N260_5$ that is finally the smallest date and thus rises again to root R1 controlled by the processor P1. In the direction root-leaves, the dates smaller than or equal to the current date (996"), that is: 298 and 387, are selected and from the selected ones the rightmost date 387 is retained. The location code of this date is determined: "01", so that the location of the node in the lower stage ($N2_1$) is obtained by admitting that the location at node $N2_1$ is given by "00", the node $N5_2$ of the lower stage is determined and so on up to the node $N65_4$ where the location of the date 387 is given by "11" which yields the node $N260_5$ comprising this date 387 at location "10". The concatenation of all these location codes yields the priority code of the theoretical date chosen, that is to say: "01 00 00 00 11 10".

Figure 7:
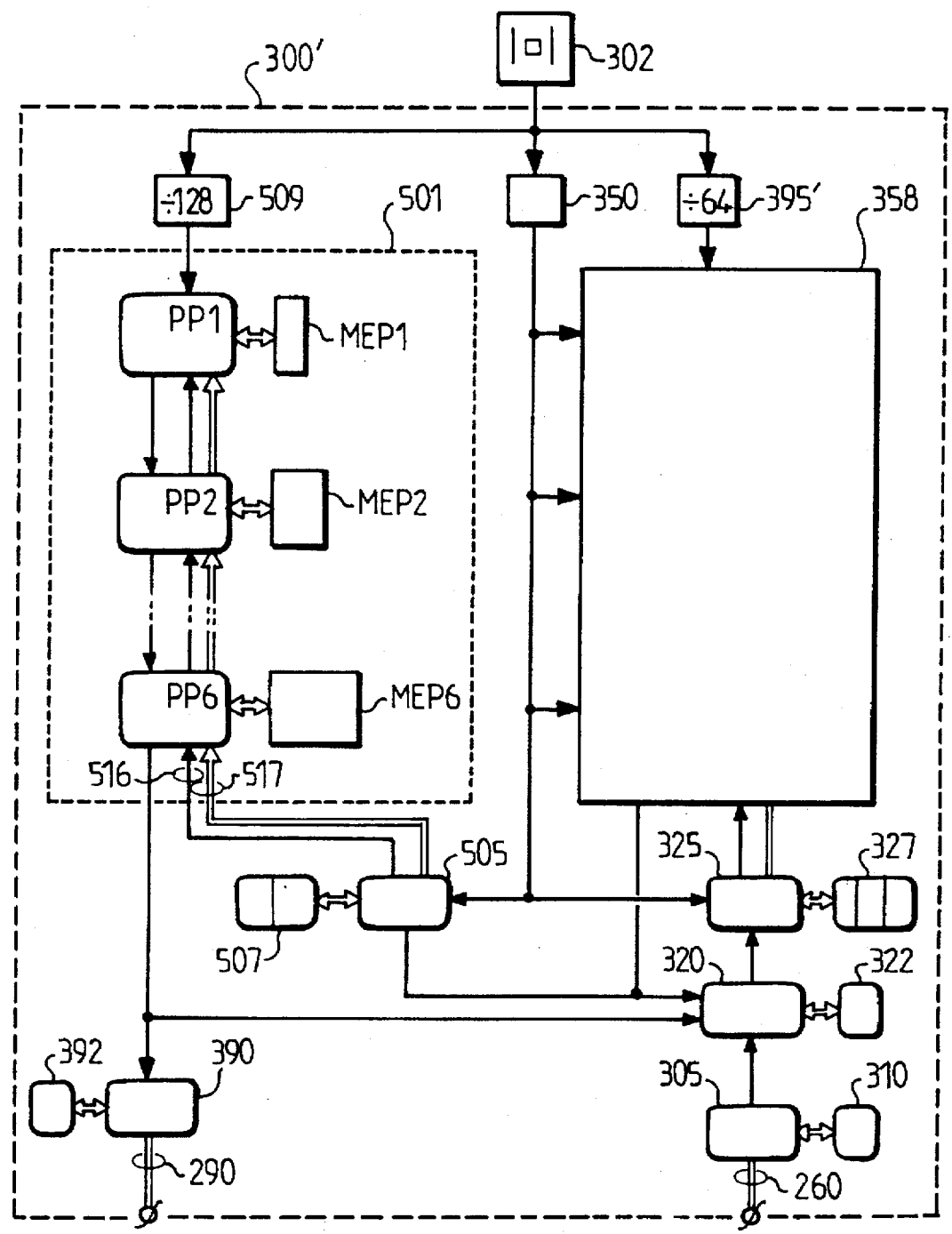
FIG. 7 shows a variant of the allocation circuit.

Another embodiment of the invention is shown in FIG. 7.

This embodiment makes it still possible to avoid the jitter for more traffic load. According to this embodiment the allocation circuit realised as a variant is referenced 300'. In this drawing Figure like elements to the preceding drawing Figures carry like references. This circuit 300' comprises, in addition to the tree circuit 358, a second tree circuit 501 whose input is connected to the output of the first tree circuit via a stop date calculator 505. This circuit determines as a function of the chosen priority code produced by the first tree circuit a stop date by cooperating with a stop date memory 507 which contains on each line indicated by a priority code its theoretical date produced by the element 325 and the stop interval $tb_i$. The stop interval is calculated as a function of a tolerance "τ" of the tolerated jitter duration $$tb_i = dth_i + \tau \cdot td_i.$$

These two tree circuits 358 and 501 shown in a cascaded combination work with different timings imposed by divider circuit 395' for the tree circuit 358 and the divider circuit 509 for the circuit 501. The second tree circuit works with a double timing, the divider circuit 509 divides the pulses of clock 302 by 128, whereas the divider circuit 395' this time divides by 64.

The second tree circuit 501 is formed by six processors PP1 to PP6 to which memories MEP1 to MEP6 respectively, are connected. This second circuit 501 has a similar structure to the first one.

In the direction leaves-root, the various stop dates with their priority codes are sent to the processor PP6 via wire sets 516 and 517, respectively. These stop dates are written in the memories MEP6. The processor PP6 feeds the smallest stop date to the processor PP5 and so on, up to the processor PP1.

In the direction root-leaves, the smallest stop date is sought by starting in the same manner with processor PP1 with respect to the theoretical dates in the tree circuit 358, but without taking the current date "dtc" into consideration. The priority code which leaves circuit 501 before being applied to circuit 390 is applied to the counting element 320 of FIG. 4 for a reduction of the number of cells to be processed. Depending on whether the permissible jitter has a value higher than 1 or not, the Table 322 will be updated by the first tree circuit 358 or the second tree circuit 501. If the tolerated jitter is such that $\tau > 1$, the Table 322 is updated by the circuit 501. If $\tau < 1$, it is the circuit 358 that updates Table 322.

In all the cases, after searching for a priority in a tree, this tree is to be updated.

Other embodiments may be found based on the embodiment described. Thus, tree-like structures other than quaternary structures may be described, more particularly, binary or even ternary tree-like structures. The leaves may also be connected to nodes on various levels.

I claim:

1. A communication system comprising an asynchronous transfer mode network which transmits, from one network access point to another access point, information cells which comprise a path identifier, said system including at least one multiplexing device formed by:

a plurality of access terminals for users who have cells to be transmitted at respective rates to a given destination defined by said path identifier, at least one connecting terminal for at least one of said access points of said network, a plurality of service circuits which comprise queue elements for storing respective user cells which have a like path identifier and for rendering the stored cells available on cell outputs, and an allocation circuit for causing a chosen one of said user cells to be supplied on said connecting terminal via an output circuit, characterized in that the allocation circuit comprises:

a correspondence table for unambiguously assigning to the path identifiers a priority code which fixes an order of transmit priority of the cells as a function of the respective rate, a theoretical transmission date calculation element for providing a theoretical transmission date as a function of the respective rate for cells received by each service circuit, and a first tree circuit constituted by
leaves for receiving the theoretical dates for each service circuit,
a root for containing root dates based upon which a highest-priority date is established, and
an extraction circuit for producing the priority code based upon root dates for selection of a date.

2. A system as claimed in claim 1, characterized in that the allocation circuit comprises:

a stop date calculation circuit for producing a date for each path identifier as a function of tolerable jitter while this tolerance is taken into consideration, and a second tree circuit having a second tree root, connected in a cascade combination with the first tree circuit, cooperating with the stop date calculation circuit for producing at said second tree root the lowest stop date based upon which said chosen one of said user cells of the path identifier is determined.

3. A system as claimed in claim 1, characterized in that the first tree circuit is formed by:

a series of layers, including a most upstream layer and a most downstream layer, running from the leaves to the root, said most upstream layer running from said leaves and said most downstream layer running up to a root node, a plurality of upstream branches for supplying to a downstream node dates coming from upstream leaves or other upstream nodes, the dates received by an upstream node including a smallest date, and a downstream branch for supplying from the upstream node to a downstream node the smallest date from the dates received by the upstream node.

4. A system as claimed in claim 3, characterized in that the first tree circuit are formed by processors, each processor being assigned to one of said layers.

5. A system as claimed in claim 3, characterized in that the extraction circuit is formed by:

a register for containing the current date updated with each cell period, a respective comparing circuit connected to each layer, having a node identification input and an output, one of said comparing circuits being an upstream comparing circuit, for producing as a destination of the upstream comparing circuit the address of the node based upon comparison of the dates contained in the node with the current date, and a concatenation circuit for producing a chosen priority code by concatenating all the codes supplied on the outputs of the comparing circuits.

6. A system as claimed in claim 5, characterized in that the first tree circuit are formed by processors, each processor being assigned to one of said layers.

7. A system as claimed in claim 5, characterized in that the allocation circuit comprises:

a stop date calculation circuit for producing a date for each path identifier as a function of tolerable jitter while this tolerance is taken into consideration, and a second tree circuit having a second tree root, connected in a cascade combination with the first tree circuit, cooperating with the stop date calculation circuit for producing at said second tree root the lowest stop date based upon which said chosen one of said user cells of the path identifier is determined.

8. A system as claimed in claim 7, characterized in that the tree circuits are formed by processors, each processor being assigned to one of said layers.

* * * * *